April 3, 1973  R. G. TROUT ET AL  3,725,021
METHOD OF PRODUCING GLASS FIBERS
Original Filed June 30, 1969  2 Sheets-Sheet 1
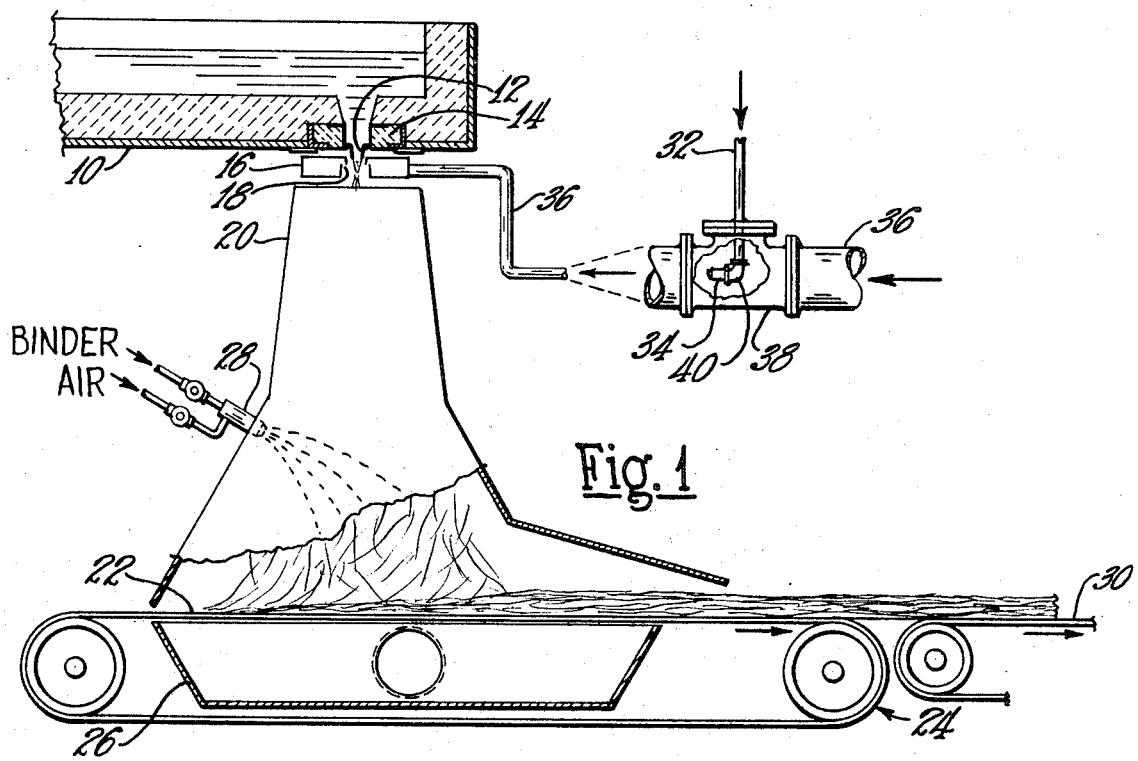
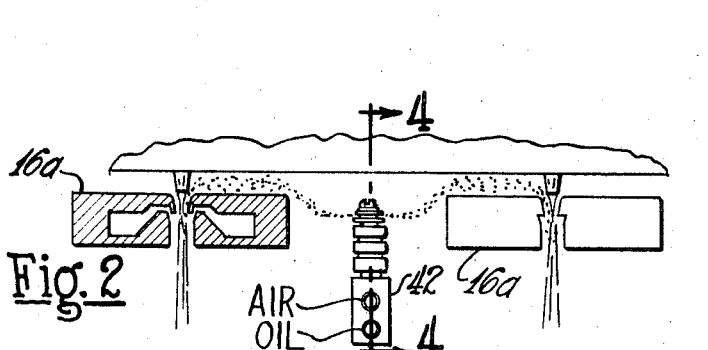
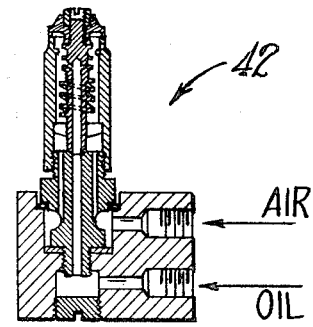
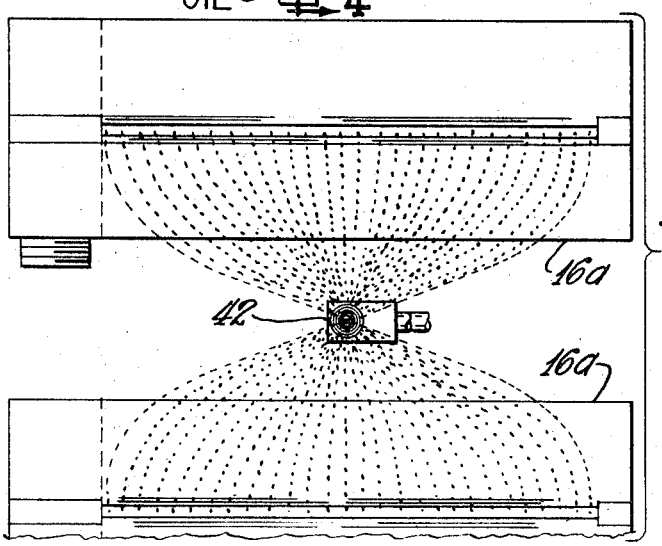
INVENTORS
ROBERT G. TROUT &
BY CHARLES J. STALEGO
Staelin + Overman
ATTORNEYS

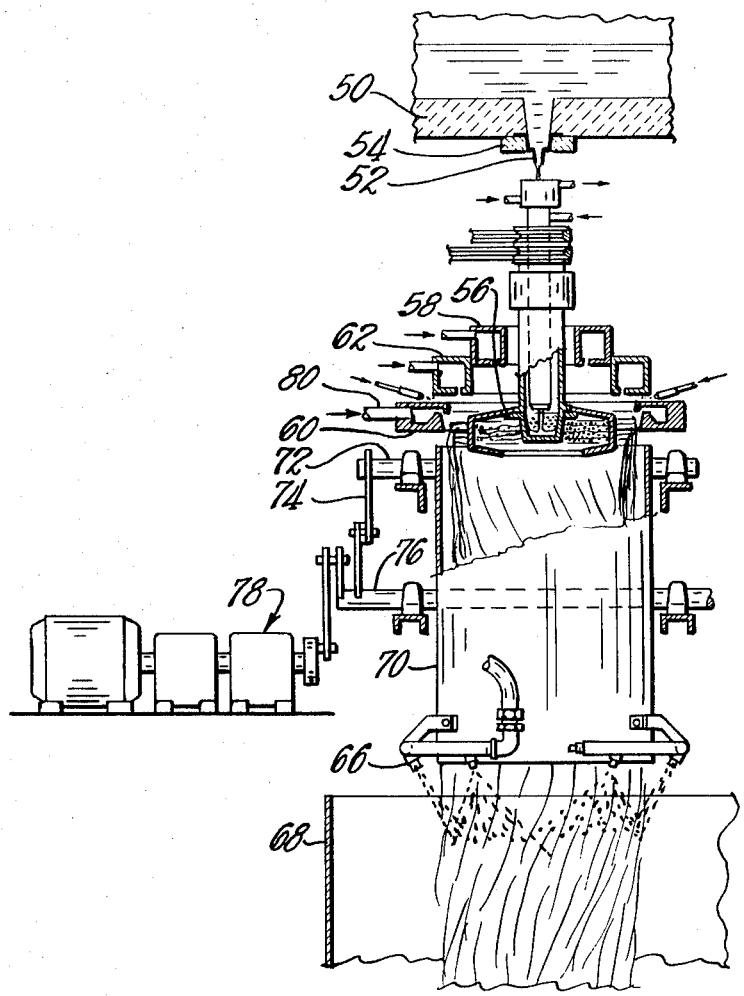
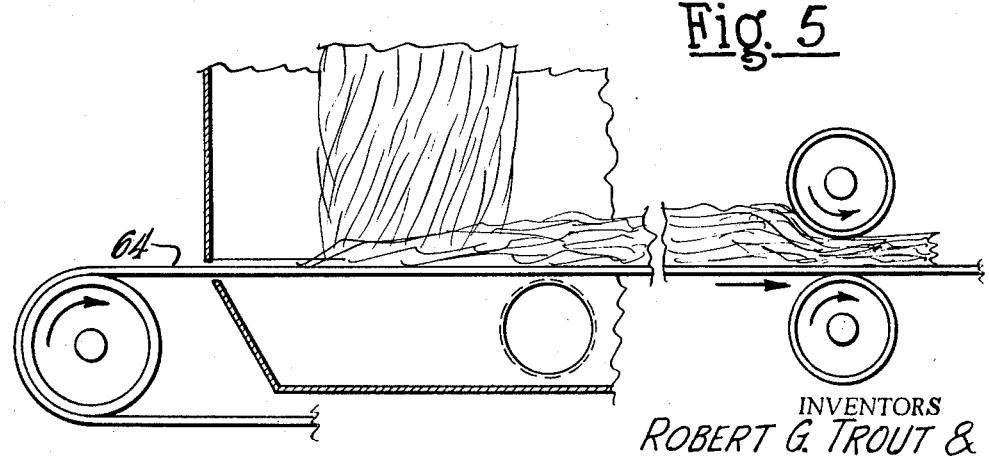
Fig. 5
INVENTORS
ROBERT G. TROUT &
BY CHARLES J. STALEGO
ATTORNEYS United States Patent Office 3,725,021
Patented Apr. 3, 1973

3,725,021
METHOD OF PRODUCING GLASS FIBERS
Robert G. Trout, Prairie Village, Kans., and Charles J. Stalego, Newark, Ohio, assignors to Owens-Corning Fiberglas Corporation
Continuation of abandoned application Ser. No. 837,528, June 30, 1969. This application Oct. 20, 1971, Ser. No. 190,999
Int. Cl. C03b 33/06
U.S. Cl. 65—3                                       7 Claims

ABSTRACT OF THE DISCLOSURE

Method and apparatus for producing mats of glass fibers that are attenuated by high velocity gases and wherein a mist of a water solution of water soluble glass lubricant such as ethylene glycol, is applied to the fibers, either during their attenuation by the high velocity gases, or prior thereto.

This is a continuation of application Ser. No. 837,528, filed June 30, 1969, now abandoned.

BACKGROUND OF THE INVENTION

Mats of randomly oriented glass fibers bonded together at their cross over points are used extensively for insulation materials, for making acoustical board, and for reinforcing plastics. The randomly oriented fibers are produced by causing high velocity gases to impinge upon molten streams of glass to simultaneously cool the streams to below their solidification point, and thereafter assert a pulling action on the solidified fibers which is transmitted back to the unsolidified glass streams to attenuate the same. Glass fibers when rubbed against each other are mutually abraided, and scratched glass, when flexed, invariably breaks. Following the impingement of the flow of attenuating gases upon the solidifying glass streams, a dispersion of an organic binder of water and an organic binder is sprayed upon the fibers, following which they are collected into the mat and the binder cured. This process has been followed ever since the inception of the glass fiber insulation producing industry in the 1930's. The gases which do the attenuating are accelerated in nozzles to, or close to, sonic velocity, and in order to produce this high velocity efficiently, the gases used have either been high pressure products of combustion, or high pressure super heated steam. The presence of water droplets in either of these gases has been viewed as an inefficiency, since upon expansion through the accelerating nozzles, the reduction in pressure causes the vaporization of the water which in turn absorbs energy from the surrounding gases doing the accelerating. For this reason, the art has conventionally used super-heated steam.

The art has never developed a process for effectively reducing the mutual abrasion of fibers produced by high velocity gases. In a couple instances, the art has put inorganic and/or organic materials on the streams of molten glass to modify or control the surface chemistry of the fibers produced (see Slayter et al. Pat. No. 2,763,099), but the treaments utilized have not effectively reduced the mutual abrasion of the fibers. The inorganic materials utilized are not lubricious, and organic materials, by themselves, do not spread out and cover the surface of the fibers. Portions of the fibers have remained unprotected, therefore, and these portions have become broken. Additionally, the streams of organic material have contacted the molten glass, and been vaporized to a large degree so that any film produced has been too thin to adequately protect the fibers even when present.

The principal object of the present invention is the provision of a new and improved method, and apparatus, for greatly reducing mutual abrasion of fibers during gas attenuation processes, so that the fibers which are produced are longer, and so that the mats made therefrom have greater strength.

SUMMARY OF THE INVENTION

According to the invention, it has been discovered that an improvement in fiber length and mat strength is achieved over prior art processes, including that of Pat. No. 2,763,099, when the fibers are attenuated by gases which contain liquid water and a lubricant which is soluble in the water. The water and lubricant can be in the form of a solution, in which case the droplets dispersed throughout the accelerating gas stream; or either the water, or water soluble lubricant, can be mixed with the gas stream, and the other of the liquids added as a mist that is injected into the already accelerated gas stream. The latter can be conveniently accomplished by utilizing the aspirating effect produced by the attenuating gas stream. In those cases wherein steam is used as the attenuating gas stream, water droplets may be caused to be entrained in the steam flow; and according to further principles of the invention, the water soluble lubricant can be added to the steam flow in the form of a mist of the lubricant, or as a water solution thereof.

DESCRIPTION OF THE DRAWINGS

FIG. 1 is a schematic side elevational view of one embodiment of the invention wherein a solution of a water soluble lubricant is inserted into the steam supply line to the steam blower which produces the attenuating gas flow;

FIG. 2 is a fragmenary sectional view of another embodiment of the invention wherein the mist is produced by air atomizing nozzles which discharge into the secondary air flow that is induced by fiber attenuating nozzles;

FIG. 3 is a plan view of the arrangement shown in FIG. 2;

FIG. 4 is a section of the nozzles shown in FIGS. 2 and 3; and

FIG. 5 is a schematic side elevational view of another embodiment of the invention wherein the fibers are produced from streams of glass discharged from a centrifuge.

DESCRIPTION OF THE PREFERRED EMBODIMENTS

The embodiment shown in FIG. 1 generally comprises a forehearth 10 having an opening 12 in a bushing plate 14 through which a small stream of glass flows continually. The small stream of glass passes between opposite halves of a steam blower 16. Each half of the steam blower contains an orifice 18 spaced approximately one half inch from the stream of glass, and each half of which discharges downwardly at an angle which converges with the glass stream at approximately ten degrees. The impingement of the steam jets accelerate the molten stream downwardly by providing a pulling force on the portion of the streams which have solidified into fibers, and the steam provides the additional effect of cooling the streams, to insure solidification, if they have not done so by the time they are contacted by the high velocity steam jets. The diameter of the fibers so produced will usually be between 0.00065 and 0.00030 inch and are discharged into a forming hood 20 which protects the fibers and gas stream from stray room air currents and assures their deposition upon the top flight 22 of a forming conveyor 24. Suction from a suction box 26 that is positioned beneath the top flight 22 pulls the gases within the forming hood downwardly to aid in the deposition of the fibers upon the top flight 22. A spray of an organic binder solution or dispersion is projected into the forming hood, as by a nozzle 28, to wet out the fibers prior to their deposition on the conveyor flight 22. The conveyor 24 moves the collected mat of binder wetted fibers onto a conveyor 30 which passes through a curing oven where the mat is cured at a temperature between 350 and 550° F. for approximately 3 to 5 minutes, depending upon the thickness of the mat.

The fibers produced by the structure above described are subjected to intense agitation by the high velocity jets discharging from the blower 16, which agitation produces a rubbing together and a mutual abrasion of the fibers. Subsequent flexing also induced by the steam jet, as well as subsequent handling, causes a certain percentage of the fibers to break, and thereby decrease their length to in turn decrease the strength of the finished cured mat.

According to the invention, the fibers immediately after their formation, and during the time they are agitated by the steam jet, are coated with water and a lubricant which is water soluble. In the present embodiment, this is conveniently accomplished by causing the steam that is supplied to the blower 16 to contain both liquid water and the liquid lubricant in the form of a fine mist, the particles of which are small enough to have a sufficiently high surface area to volume ratio as to be uniformly dispersed throughout the steam. In the embodiment shown, the lubricant, preferably in the form of an aqeuous solution, is pumped through a conduit 32 to a spray nozzle 34 that is located within a section of the steam header 36 leading to the blower 16. In the embodiment shown, the conduit 32 is welded into a flange that is bolted to the side outlet flange of a T 38 that is of a larger pipe size than the header connected to the blower 16, and which is sufficiently large that the nozzle 34 and elbow 40 to which it is connected, can be withdrawn through the side outlet of the T. The nozzle discharges in a down stream direction and has a spray pattern which blankets the cross section of the outlet of the T, so that the mist from the nozzle is distributed throughout the flowing steam. The steam that is used is preferably a saturated steam, so that the water that is introduced either by the nozzle 34 as a solution, or by an additional nozzle, not shown, will not be evaporated before passing through the orifice 18.

The following is a table of the results which were achieved using the apparatus above described, but having a number of bushings 14 with orifices 12 therein discharging into the forming hood to produce mat on a commercial scale.

TABLE 1

| Steam | Lubricant used | Dilution ratio | Break strength per inch of mat |
|---|---|---|---|
| Superheated | | 0 | 45.0 |
| Do | Ethylene glycol | 2:1 | 59.0 |
| Do | do | 4:1 | 48.0 |
| Saturated | do | 4:1 | 66.7 |
| Do | | | 51.7 |
| Do | Ethylene glycol | 2:1 | 63.8 |
| Do | do | 4:1 | 65.2 |
| Do | do | 12:1 | 61.0 |
| Do | do | 16:1 | 60.2 |
| Do | Glycerine | 12:1 | 67.3 |
| Do | do | 16:1 | 71.2 |
| Do | Cationic lubricant [1] | | |
| Do | Silicone No. EF13557 | 60:1 | 54.5 |

[1] The cationic lubricant used was the reaction product of 1.8 mols of stearic acid to 1 mol of tetraethylene pentamine.

The mat which was made on the above equipment had a weight of 3 oz. per square foot, was 30.0 mil. thick and had 5.0 percent of a phenol-formaldehyde binder. The binder was produced by charging a reactor with 80 parts of phenol, 123 parts of a 53% water solution of a formaldehyde, 19.3 parts of water, and 12 parts of barium hydrate. The reactor was heated for a total of 7 hours in which time it was stirred with a propeller type agitator. The charge was first heated to 110° F. and maintained at this temperature for approximately 2 hours, and was then heated and held at approximately 140° F. for the remaining 5 hours, at which time the refractive index of the reaction product was 1.420, and the infrared absorption analysis indicated it was substantially free of unreacted phenol and methylene groups. The reaction product was then cooled to approximately 100° F., and was neutralized with sulfuric acid to a pH of about 7.5. A 28 part charge of dicyandiamide was added to the neutralized reaction product, and the resulting mixture was heated to and maintained at approximately 140° F. for one hour. The reaction product was then cooled to approximately 75° F. and was neutralized with further sulfuric acid to a pH of approximately 7.4. Eighty parts of this resin was then combined with 20 parts of pine wood pitch extract, 800 parts by weight of water, and one part of gamma aminopropyltriethoxysilane.

The mat which was produced was 0.030 inch thick. The mat was cut into three inch wide samples which were subjected to a tensile force, and the force required to tear the mat apart is given in the table. In all instances, the lubricant was pumped through the line 32 either in the undiluted or the diluted form as indicated in the table, using an amount to give a mat having 5% binder.

The embodiment shown in FIG. 2 is generally similar to that shown in FIG. 1 excepting that the additive is introduced over the top of the blower as a mist that is pulled into the steam jet by reason of its aspiration effect. Those portions of the embodiment shown in FIG. 2 which are similar to portions of the embodiment shown in FIG. 1 are designated by a like reference numeral characterized further in that a subscript $a$ is affixed thereto.

The apparatus shown in FIG. 2 includes a fog nozzle 42 which discharges laterally into the secondary air flow that is induced by blower 16a. This equipment when used to make a mat of the same density, binder material and binder fiber ratio, as given for that in Table 1, produce a mat having the same general properties.

The embodiment shown in FIG. 5 uses a centrifuge to produce primary course fibers which are attenuated by high velocity gases into fine fibers. The fiber forming apparatus comprises a forehearth 50 having an opening 52 in a bushing plate 54 through which a small stream of glass flows continuously. The molten stream of glass falls into a centrifuge basket 56 having a plurality of small openings in its periphery, from which fine streams of glass issue in what are called primary fibers. The primary fibers are attenuated by high velocity products of combustion which discharge from the burner 58 over the periphery of the basket 56. Thereafter the fibers are further accelerated by high velocity steam issuing from the steam blower 60, which draws draws secondary air over the top of the blower 60; and this secondary air is heated by a secondary burner 62, as is necessary to control the attenuation of the fibers. The "veil" of fibers so produced is collected on a conveyor 64 in the form of a mat. During travel to the collection conveyor, the fibers are wetted out by a binder solution by means of the nozzles 66. Laterally adjustable side walls 68 are provided on opposite sides of the conveyor by the fiber distribution tubes 70 which are pivoted on a shaft 72 having a crank arm 74 thereon, which is moved back and forth by a rock shaft 76. The rock shaft 76 driven by an electric motor and structure indicated generally at 78 which converts rotation into the desired oscillation.

During the final attenuation by the steam blowers 60 which produces the secondary, or fine fibers, the fibers are coated with a water solution of a lubricant, by introducing a mist thereof into the steam line 80 which leads to the blower 60. This mist can be added to the steam line 80 in the same manner indicated for FIG. 1 above, so that the same benefit is derived by reason thereof as is had with the embodiment shown in FIG. 1.

In general, any organic water soluble lubricant such as a polyol, or a soluble fatty acid, and particularly those which are made cationic by reaction with an amine acidified to provide a substituted ammonium group, can be used as a lubricant. Suitable examples will include, in addition to those given above, alkyl sulfonates, polyoxyethylated vegetable oils, 1-(2-hydroxyethyl)-2-n-alkyl imidazoline (Nalcamine G–11), alkyl phenoxy polyoxyethylene ethanol, polyoxyethylene stearates, sulfonated caster oil, fatty amine condensate, sodium alkylnaphthalene sulfonate, sorbitan fatty esters, as for example, sorbitan monopalmitate, sorbitan monostearate, sorbitan tristearate, etc., sodium sulfonate derivative of 7-ethyl-2-methyl, 4-undecanol (Tergitol 4), sodium sulfonate derivative of 3,9-diethyl tridecanol-6 (Tergitol 7), polyoxyethylated tridecyl alcohol, glycerol monostearate, octylphenol polyethoxyethanol, polyoxyethylene sorbitan monostearate, modified coconut diethanolamide, isooctyl phenyl polyethoxy ethanol (Triton X–100), or other water soluble detergents, wetting agents and/or emulsifiers, hereafter called glass fiber lubricants.

While the invention has been described in considerable detail, we do not wish to be limited to the particles embodiments shown and described, and it is our intention to cover hereby all novel adaptations, modifications, and arrangements thereof which come within the practice of those skilled in the art to which the invention relates.

We claim:

1. In the process of producing glass fibers wherein molten streams of glass are attenuated and solidified into small diameter fibers, which are impinged upon by a flow of high velocity gases which pull the fibers into their attenuated condition, the step of: supplying a mist of a water solution of a water soluble glass lubricant to the glass streams at a time no later than when the glass fibers are forced into abraiding contact by the attenuating gases to substantially coat the glass fibers with the water and lubricant before abrasion takes place and thereby reduce mutual abrasion between the attenuated fibers.

2. The process of claim 1 wherein a mist of the water soluble lubricant is generated and the aspiration effect of the high velocity attenuating gas flow is utilized to pull the mist into contact with the fibers.

3. The process of claim 1 wherein the lubricant is introduced into a conduit of a gas while the gas is under a high pressure, and wherein the gas with the lubricant solution is thereafter expanded through a flow accelerating nozzle for impingement with the streams.

4. The process of claim 3 wherein the gas is steam.

5. The process of claim 3 wherein the lubricant is a glycol.

6. The process of claim 3 wherein the lubricant is glycerine.

7. The process of claim 3 wherein the lubricant is a cationic lubricant.

References Cited

UNITED STATES PATENTS

| | | | |
|---|---|---|---|
| 2,206,058 | 7/1940 | Slayter | 65—4 |
| 2,491,889 | 12/1949 | Bennett | 65—11R |
| 2,604,688 | 7/1952 | Slayter | 117—126 GQ |
| 2,653,416 | 10/1953 | Slayter | 65—11R |
| 2,763,099 | 9/1956 | Slayter | 65—11R |
| 2,920,981 | 1/1960 | Whitehurst | 117—126 GQ |
| 3,273,358 | 9/1966 | Kleist | 65—14 |
| 3,287,096 | 11/1966 | Marzocchi | 117—126 GQ |

ROBERT L. LINDSAY, JR., Primary Examiner

U.S. Cl. X.R.

65—5, 6; 117—126 GQ